(12) United States Patent
Maneriker et al.

(10) Patent No.: US 11,194,958 B2
(45) Date of Patent: Dec. 7, 2021

(54) FACT REPLACEMENT AND STYLE CONSISTENCY TOOL

(71) Applicant: Adobe Inc., San Jose, CA (US)

(72) Inventors: Pranav Ravindra Maneriker, Bengaluru (IN); Vishwa Vinay, Bangalore (IN); Sopan Khosla, Bangalore (IN); Niyati Himanshu Chhaya, Hyderabad (IN); Natwar Modani, Bangalore (IN); Cedric Huesler, San Francisco, CA (US); Balaji Vasan Srinivasan, Bangalore (IN); Anandha velu Natarajan, Bengaluru (IN)

(73) Assignee: Adobe Inc., San Jose, CA (US)

( * ) Notice: Subject to any disclaimer, the term of this patent is extended or adjusted under 35 U.S.C. 154(b) by 253 days.

(21) Appl. No.: 16/123,966

(22) Filed: Sep. 6, 2018

(65) Prior Publication Data
US 2020/0081964 A1 Mar. 12, 2020

(51) Int. Cl.
*G06F 40/10* (2020.01)
*G06F 40/166* (2020.01)
(Continued)

(52) U.S. Cl.
CPC .......... *G06F 40/166* (2020.01); *G06F 40/103* (2020.01); *G06F 40/109* (2020.01);
(Continued)

(58) Field of Classification Search
None
See application file for complete search history.

(56) References Cited

U.S. PATENT DOCUMENTS

| 6,002,867 A | 12/1999 | Jazdzewski |
| 6,134,397 A | 10/2000 | Shimazaki et al. |

(Continued)

OTHER PUBLICATIONS

M. C. Surabhi, "Natural language processing future," 2013 International Conference on Optical Imaging Sensor and Security (ICOSS), Coimbatore, 2013, pp. 1-3.*

(Continued)

*Primary Examiner* — Maikhanh Nguyen
(74) *Attorney, Agent, or Firm* — FIG. 1 Patents

(57) ABSTRACT

A fact replacement and style consistency tool is described. Rather than rely heavily on human involvement to replace facts and maintain consistent styles across multiple digital documents, the described change management system identifies factual and stylistic inconsistencies between these documents, in part, using natural language processing techniques. Once these inconsistencies are identified, the change management system generates a user interface that includes indications of the inconsistencies and information describing them, e.g., an indication noting not only a type of inconsistency but also presenting a first portion and at least a second portion of the multiple documents that are factually inconsistent. By automatically identifying these factual and stylistic inconsistencies across multiple documents and presenting indications of such cross-document inconsistencies, the described change management system eliminates human errors in connection with maintaining factual and stylistic consistency over a body of documents.

20 Claims, 10 Drawing Sheets

(51) Int. Cl.
  *G06N 20/00* (2019.01)
  *G06F 40/30* (2020.01)
  *G06F 40/109* (2020.01)
  *G06F 40/103* (2020.01)
  *G06F 40/253* (2020.01)

(52) U.S. Cl.
  CPC ............ *G06F 40/253* (2020.01); *G06F 40/30* (2020.01); *G06N 20/00* (2019.01)

(56) References Cited

U.S. PATENT DOCUMENTS

| | | | |
|---|---|---|---|
| 8,346,620 B2 | 1/2013 | King et al. | |
| 9,747,259 B2* | 8/2017 | Kapadia | G06F 40/197 |
| 10,095,692 B2* | 10/2018 | Song | G06F 40/56 |
| 10,489,498 B2 | 11/2019 | Vinay et al. | |
| 10,579,725 B2* | 3/2020 | de Mello Brandao | G06F 3/0481 |
| 10,846,466 B2 | 11/2020 | Vinay et al. | |
| 2002/0129053 A1 | 9/2002 | Chan et al. | |
| 2004/0210842 A1 | 10/2004 | Qamar et al. | |
| 2006/0136352 A1 | 6/2006 | Brun et al. | |
| 2007/0156745 A1 | 7/2007 | Harrington | |
| 2008/0052684 A1 | 2/2008 | Bowdidge et al. | |
| 2009/0076792 A1 | 3/2009 | Lawson-Tancred | |
| 2010/0063799 A1* | 3/2010 | Jamieson | G06F 16/36 704/9 |
| 2011/0078165 A1 | 3/2011 | Battle et al. | |
| 2012/0151312 A1 | 6/2012 | Clee et al. | |
| 2013/0066823 A1* | 3/2013 | Sweeney | G06N 5/02 706/50 |
| 2013/0326349 A1 | 12/2013 | Mehalingam et al. | |
| 2014/0164315 A1 | 6/2014 | Golshan | |
| 2014/0172417 A1* | 6/2014 | Monk, II | G06F 40/30 704/9 |
| 2014/0279729 A1 | 9/2014 | Delaney et al. | |
| 2014/0351788 A1 | 11/2014 | Bienkowski et al. | |
| 2015/0012528 A1* | 1/2015 | Kapadia | G06F 40/169 707/722 |
| 2015/0261745 A1* | 9/2015 | Song | G06F 40/56 704/9 |
| 2015/0378997 A1* | 12/2015 | Becker | H04L 65/403 707/748 |
| 2016/0098574 A1 | 4/2016 | Bargagni | |
| 2018/0267950 A1* | 9/2018 | de Mello Brandao | G06F 3/0481 |
| 2019/0155880 A1 | 5/2019 | Vinay et al. | |
| 2019/0251150 A1 | 8/2019 | Vinay et al. | |

OTHER PUBLICATIONS

Sengupta et al., "Automatic extraction of glossary terms from natural language requirements," IEEE International Requirements Engineering Conference (RE), Rio de Janeiro, 2013, pp. 314-319.*
"Non-Final Office Action", U.S. Appl. No. 15/821,468, dated Mar. 20, 2020, 23 pages.
"Notice of Allowance", U.S. Appl. No. 15/821,468, dated Jul. 22, 2020, 8 pages.
"Notice of Allowance", U.S. Appl. No. 15/897,059, dated Jul. 9, 2019, 9 pages.
"Create dynamic PDF documents in Adobe InDesign", Retrieved at https://helpx.adobe.com/indesign/using/dynamic-pdf-documents.html—on Nov. 2, 2017, 10 pages.
"Creating and Managing Content Fragments", Retrieved at: https://helpx.adobe.com/experience-manager/6-2/assets/using/content-fragments.html—on Nov. 2, 2017, 19 pages.
"Personalizing content", Retrieved at: https://webhelp.episerver.com/15-2/EN/Content/EN/CMS%20Edit/Edit_Personalization.htm—on Apr. 17, 2018, 2 pages.
"Sitecore Documentation: Edit the website content", Retrieved at: https://doc.sitecore.net/sitecore_experience_platform/content_authoring/creating_and_editing_items/editing/edit_the_website_content—on Apr. 17, 2018, 5 pages.
"Web Content Management | Acquia", Retrieved at: https://www.acquia.com/solutions/web-content-management—on Apr. 17, 2018, 6 pages.
"Wysiwyg | Drupal.org", Retrieved at: https://www.drupal.org/project/wysiwyg—on Apr. 17, 2018, 2 pages.
Abustan,"Gibane Group Research Report: Smart Content in the Enterprise", Sep. 7, 2010, 2 pages.
Bock,"Smart Content in the Enterprise—How Next Generation XML Applications Deliver New Value to Multiple Stakeholders", Aug. 2010, 87 pages.
Chu,"KATARA: A Data Cleaning System Powered by Knowledge Bases and Crowdsourcing", Proceedings of the 2015 ACM SIGMOD International Conference on Management of Data, May 27, 2015, 15 pages.
Gehrmann,"Deploying AI Methods to Support Collaborative Writing: a Preliminary Investigation", May 21, 2015, 8 pages.
Georgescu,"Extracting Event-Related Information from Article Updates in Wikipedia", ECIR 2013, Mar. 24, 2013, 12 pages.
Hoffart,"YAGO2: A spatially and temporally enhanced knowledge base from Wikipedia", Artificial Intelligence vol. 194, Jan. 2013, 28 pages.
Kasneci,"NAGA: Harvesting, Searching and Ranking Knowledge", SIGMOD Conference2008, Jun. 12, 2008, 3 pages.
Kenter,"Siamese CBOW: Optimizing Word Embeddings for Sentence Representations", Proceedings of the 54th Annual Meeting of the Association for Computational Linguistics, 2016, Aug. 7, 2016, pp. 941-951.
Levy,"Dependency-Based Word Embeddings", Proceedings of the 52nd Annual Meeting of the Association for Computational Linguistics (Short Papers), 2014, Apr. 25, 2014, pp. 302-308.
Liu,"A Sentence Interaction Network for Modeling Dependence between Sentences", Proceedings of the 54th Annual Meeting of the Association for Computational Linguistics, Aug. 7, 2016, pp. 558-567.
MacComascaigh,"Magic Quadrant for Web Content Management", Sep. 28, 2016, 32 pages.
Mikolov,"Efficient estimation of word representations in vector space", arXiv preprint arXiv:1301.3781 (2013), Sep. 7, 2013, 12 pages.
Neuwirth,"Flexible Diff-ing in a Collaborative Writing System", Nov. 1992, 8 pages.
Palangi,"Deep Sentence Embedding Using Long Short-Term Memory Networks: Analysis and Application to Information Retrieval", EEE/ACM Transactions on Audio, Speech, and Language Processing, Jan. 16, 2016, 25 pages.
Schuhmacher,"Knowledge-based Graph Document Modeling", WSDM '14 Proceedings of the 7th ACM international conference on Web search and data mining, Feb. 28, 2014, 10 pages.
Tai,"Improved Semantic Representations From Tree-Structured Long Short-Term Memory Networks", ACL 2015, Jul. 26, 2015, pp. 1556-1566.
Tschuggnall,"Overview of the Author Identification Task at PAN-2017: Style Breach Detection and Author Clustering", Dec. 2017, 22 pages.
Yu,"Deep Learning for Answer Sentence Selection", CoRR 2014, Dec. 4, 2014, 9 pages.
Zhong,"Aligning Knowledge and Text Embeddings by Entity Descriptions", EMNLP 2015, Sep. 17, 2015, pp. 267-272.
Zhu,"CEPT: Collaborative Editing Tool for Non-Native Authors", Feb. 25, 2017, 13 pages.
"First Action Interview Office Action", U.S. Appl. No. 15/821,468, dated Sep. 16, 2019, 15 pages.
"Pre-Interview First Office Action", U.S. Appl. No. 15/821,468, dated Aug. 2, 2019, 16 pages.
"Supplemental Notice of Allowance", U.S. Appl. No. 15/897,059, dated Sep. 11, 2019, 2 pages.
"Final Office Action", U.S. Appl. No. 15/821,468, dated Dec. 19, 2019, 17 pages.

(56) References Cited

OTHER PUBLICATIONS

"Supplemental Notice of Allowability", U.S. Appl. No. 15/897,059, dated Oct. 22, 2019, 2 pages.

* cited by examiner

Review Modifications

| | 402a<br>Version 1 | 402b<br>Version 2 |
|---|---|---|
| Transformational Paraphrase | Some Earth people think that Pluto shouldn't be called a planet. | Planetary status of Pluto has been a controversial topic. |
| Modification | Pluto is currently the ninth planet from the Sun but it will be the eighth planet in about 230 years. | Pluto is currently the eighth planet from the Sun but it will be the 8th planet in about 230 years. |
| Lexical Paraphrase | Uranus has a pretty blue color, and thin set of rings. | Uranus has a beautiful blue color, and thin set of rings. |
| Modification | Neptune is the eighth planet from the Sun. | Neptune is the ninth planet from the Sun. |
| Insertion | A comet is made of ice, rocks, and dust ... | A comet is made of ice, rocks, gas, and dust ... |

Revised Version

Uranus is the seventh planet from the Sun. Uranus is tipped on its side compared with other planets. Uranus has a beautiful blue color, and thin set of rings. Neptune is the ninth planet from the Sun. In about 230 years, Pluto will be the eighth planet from the Sun for a while. The shapes of our orbits will make Pluto closer to the Sun for 20 years. Pluto has something in common with few other planets, it has rings just like they do. A comet is made of ice, rocks, gas, and dust, and it's famous for having a tail when it gets near to the Sun. Pluto is currently the eighth planet from the Sun but it will be the 8th planet in about 230 years. Earth's moon is actually larger than Pluto. Initially, when Pluto was discovered, The Space Times newspaper thought it should be named Minerva. Planetary status of Pluto has been a controversial topic.

● Finish

*Fig. 4*

Thank you for reviewing these changes. Here is a change sumary:

- 1 Style Breach
- 2 Trailing Changes
- 2 Paraphrasing Changes
- 2 Factual Changes
- 4 Variant Updates We have discovered the following fragments that are impacted by these changes:

PLANETS
Beautiful Saturn
1 month ago

BIG BANG
Cosmic Neutrinos
1 month ago

PLANETS
Artistic Jupiter
1 month ago

BIG BANG
Return to Pluto
1 month ago

Update

Finish

Fig. 7

FACT REPLACEMENT AND STYLE CONSISTENCY TOOL

BACKGROUND

Document creation systems continue to make advances in computing technologies to create and proliferate (e.g., publish) digital documents. With these advances, the number of digital documents available for consumption by computing device users is not only unfathomably large, but also continues to grow. As a result of explosive growth in the behavior of commonly using different types of computing devices—a user may often use more than one type of computing device over the course of a day such as a desktop, a mobile phone, and a tablet or laptop—document creation systems also generate different versions of a given document that are optimized for presentation via these different types of devices. Due to the sheer number of digital documents available and any respective different versions, managing the information included in and associated with these digital documents is virtually impossible for humans. Consequently, document management systems have been developed that manage various aspects associated with maintaining these digital documents, taking portions of the management burden away from human users.

Conventional document management systems include functionality to propagate changes made to a digital document by an editing user to other collaborating users so that these collaborating users can select to approve the changes or not. Based on the input from the collaborating users, these document management systems modify the digital document under consideration accordingly and publish the digital document. Generally speaking, users—such as users that provide input to draft, edit, and collaborate on documents—perform these actions based on information available to them at the time of drafting, editing, or collaborating. Invariably, some of this information may be incorrect or may change over time, users may have mistaken assumptions regarding certain facts, or there may be some combination of incorrect information considered and factual mistakes made.

Regardless, digital documents having the incorrect information may be propagated, e.g., sent via email, published via a website, and so forth. Later, this incorrect information and/or these factual mistakes may be discovered or realized, such as by a reader, due to sweeping taxonomic changes (e.g., declassification of Pluto from a planet and subsequent reclassification as a "dwarf planet"), based on occurrence of particular events, and so forth. In propagating document updates, however, conventional document management systems rely heavily on involvement of users, (e.g., editing users and collaborating users) to identify, make, and approve factual changes. By relying on the involvement of human users, though, conventional document management systems fail to account for the nearly inevitable human error that occurs in connection with manual reviews. Consequently, conventional document management systems continue to allow digital documents having factual errors and other inconsistencies to be propagated.

SUMMARY

To overcome these problems, a fact replacement and style consistency tool is leveraged in a digital medium environment. Rather than rely heavily on human involvement to replace facts and maintain consistent styles across multiple digital documents, the described change management system identifies factual and stylistic inconsistencies between these documents, in part, using natural language processing techniques. Once these inconsistencies are identified, the change management system generates a user interface that includes indications of the inconsistencies and information describing them, e.g., an indication noting not only a type of inconsistency but also presenting a first portion and at least a second portion of the multiple documents that are factually inconsistent. The change management system also provides functionality to commit edits to the multiple documents to achieve factual and stylistic consistency.

In contrast to conventional document management systems, the described change management system identifies inconsistencies at a sentence level rather than at a paragraph level, and further identifies the inconsistencies across multiple documents—not merely within a single document. By automatically identifying these factual and stylistic inconsistencies across multiple documents and presenting indications of such cross-document inconsistencies, the described change management system eliminates human errors in connection with maintaining factual and stylistic consistency over a body of documents. Moreover, the indications presented by the described change management system enable users to easily view identified factual and stylistic inconsistencies and different portions of the multiple documents where those inconsistencies are present. The change management system also presents instrumentalities via which users can provide input for making those different portions factually and stylistically consistent.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

FIG. 4 depicts an example implementation of intelligent review of a digital document as part of implementing fact replacement and style consistency across multiple documents.

FIG. 7 depicts an example implementation in which an update of a document corpus is performed as part of implementing fact replacement and style consistency across multiple documents.

DETAILED DESCRIPTION

Overview

Figure 1:
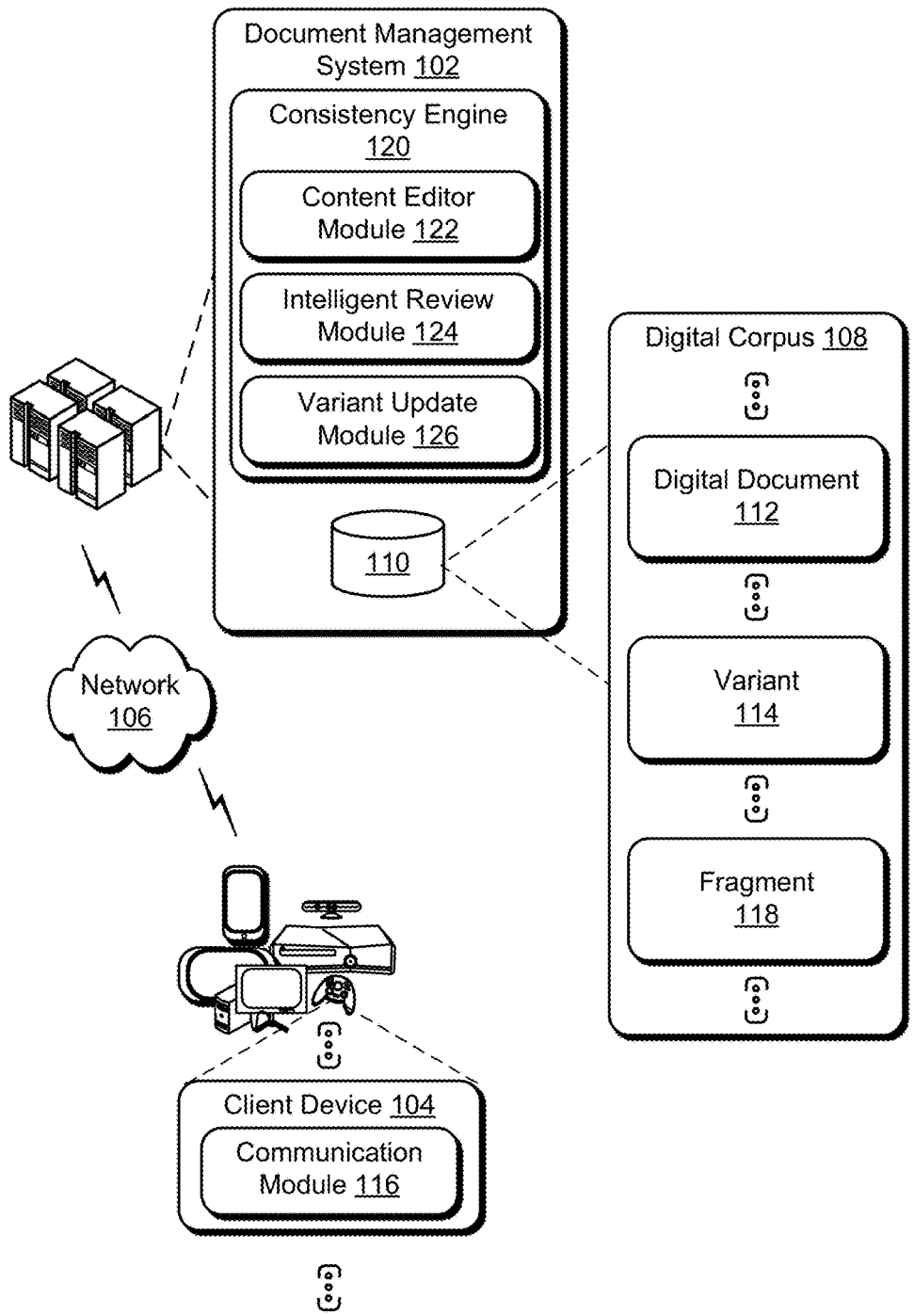
FIG. 1 is an illustration of an environment in an example implementation that is operable to employ techniques for a fact replacement and style consistency tool as described herein.

As a result of explosive growth in the behavior of commonly using different types of computing devices—a user may often use more than one type of computing device over the course of a day such as a desktop, a mobile phone, and a tablet or laptop—many document creation systems generate different versions of a given digital document that are optimized for presentation via these different types of devices. Due to the sheer number of digital documents available and any respective different versions, managing the information included in and associated with these digital documents is virtually impossible for humans.

Consequently, document management systems have been developed that manage various aspects associated with maintaining these digital documents, taking portions of the management burden away from human users. Conventional document management systems still rely on the involvement of human users, however, such as to review digital documents for potential changes and, in collaborative settings, approve changes made by other users. By relying on the involvement of human users, though, conventional document management systems fail to account for the nearly inevitable human error that occurs in connection with manual reviews, e.g., for fact checking, replacing incorrect or outdated facts, and so forth. Consequently, conventional document management systems continue to allow digital documents having factual errors and other inconsistencies to be propagated.

To overcome these problems, a fact replacement and style consistency tool is leveraged in a digital medium environment. Rather than rely heavily on human involvement to replace facts and maintain consistent styles across multiple digital documents, the described change management system identifies factual and stylistic inconsistencies between these documents, in part, using natural language processing (NLP) techniques. In particular, the described system uses an NLP model trained to describe semantic characteristics of text at a sentence level, which contrasts with conventional NLP models limited to describing text at a paragraph level. Additionally, the described system identifies factual and stylistic inconsistencies between sentences across a "corpus" of documents (e.g., multiple digital documents) not just within a single digital document. By identifying inconsistencies across a corpus of documents, the described system eliminates reliance on human review of each document in a corpus for factual or stylistic inconsistencies, such as inconsistencies that arise when a user changes a fact or style in a single sentence of the corpus.

Once the described change management system identifies factual and stylistic inconsistencies, the system generates a user interface that includes indications of the inconsistencies and information describing them. By way of example, the described change management system configures the user interface not only with an indication noting a type of inconsistency (e.g., factual, stylistic, etc.) but also with indications of a first sentence and at least a second sentence of the corpus that are factually inconsistent. In such a scenario, the first sentence may have been edited based on user-editing inputs to change a fact included in the sentence, e.g., changing the classification of Pluto from a "planet" to a "dwarf planet." Further, the at least second sentence in this scenario is identified from the corpus as having an inconsistency with the noted first sentence, e.g., the at least second sentence describes Pluto as a planet, not as a dwarf planet. Indeed, the described system is capable of identifying one or multiple other sentences across the entire corpus (e.g., within the same document as the first sentence and within each of the corpus's other documents) that may have inconsistencies with the noted first sentence. In any case, these indications provided by the described system allow a user to view not only a type of inconsistency, but also where in the corpus of documents the inconsistency is present.

In addition to presenting these indications, the described change management system also provides functionality to rectify inconsistencies. Responsive to an input received via the user interface to rectify an inconsistency displayed via the user interface, for instance, the described change management system changes the sentence having the identified inconsistency so that the identified sentence matches the sentence in which the fact or style was edited by the user. The described change management system provides the functionality to change each such inconsistency across a corpus of documents, since a single user edit can cause inconsistencies in multiple sentences throughout the corpus. By identifying such inconsistencies and providing functionality to easily rectify them, the described change management system facilitates propagation of factually and stylistically consistent documents. As a result of propagating factually and stylistically consistent documents with the described change management system, entities (e.g., news services, advertisers, publishing services, and so forth) can maintain reader trust in the information propagated via their digital documents.

Term Descriptions

As used herein, the term "digital document" refers, generally, to one or more text compositions. However, a digital document may be configured in a variety of ways without departing from the spirit or scope of the techniques described herein. Examples of digital document configurations include a word processing document to record text, spreadsheets to record numbers and numerical relationships, presentations that serve as a basis for lectures and notes, digital images of artworks, webpages, blogs, and so forth.

As used herein, the term "corpus of documents" refers to multiple digital documents. The documents within a given corpus are generally related in some way, e.g., by metadata, stored in a common file, some other relational data, and so forth. A corpus of documents may be leveraged, for instance, in connection with propagating different versions of a particular document for different types of devices, e.g., desktops, mobile phones, laptops, tablets, and so forth. In particular, the different versions in a corpus may each be optimized in some way for a respective device type. A corpus of documents may also be leveraged in scenarios other than for different device types without departing from the spirit or scope of the techniques described herein, such as a corpus where each document version is directed to a different user audience.

As used herein, the term "master text composition" refers, generally, to an indicated text composition identifying a particular digital document with respect to other digital documents from a corpus of digital documents. Any number of variant text composition may be assigned to a digital document. However, only a single master text composition is typically assigned to a digital document.

As user herein, the term "variant text composition" refers, generally, to a text composition not indicated as a master text composition which identifies a particular digital document with respect to other digital documents. Variant text compositions are typically generated from the master text composition of the digital document to which the variant text compositions are assigned. In some cases, variant text compositions are embedded within assigned digital documents. In other cases, variant text compositions are stored and maintained separately from assigned master text compositions. In many instances, different variant text compositions of a digital document are assigned to different computing contexts so that when a device requests the digital document, the appropriate version of the digital document is automatically selected for transmission to the device, e.g., on a web site. Examples of computing context include any combination of user attributes and device attributes, such as user demographic information, location information, browser information or type, hardware information or type (e.g., a hardware profile), and so forth. It will be appreciated that other configurations are possible to represent master and variant text compositions, as well as to associate variant text compositions with master text compositions.

As user herein, the term "fragment" refers, generally, to a data object representing unique identifying data for organizing content associated with a digital document. Typically, master text compositions and variant text compositions are associated with content IDs. A master fragment is a data object representing a master text composition, the master content ID, and any variant content IDs assigned to the master fragment. A variant fragment is a data object representing a variant text composition and the variant content ID.

As used herein, a "portion" of a digital document refers, generally, to a discrete representation of text, e.g., defined number of characters, words, sentences, or paragraphs. However, a portion may refer to a variety of different discrete representations of text without departing from the spirit or scope of the techniques described herein.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques for a fact replacement and style consistency tool as described herein. The illustrated environment 100 includes a document management system 102 and a client device 104 that are communicatively coupled, one to another, via a network 106.

Computing devices that are usable to implement the document management system 102 and the client device 104 may be configured in a variety of ways. A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 10.

The document management system 102 is configured to manage creation, publication, and maintenance of digital documents. As shown, the document management system 102 includes a digital corpus 108 stored in a storage device 110. The digital corpus 108 includes a plurality of digital documents, such as a digital document 112. A user can also interact with the document management system 102, for example, using the client device 104, in order to provide one or more digital documents and/or variant documents to the document management system 102. As shown, the digital corpus 108 includes a plurality of variant documents, such as a variant 114. Although the digital corpus 108 is illustrated as part of the document management system 102, this functionality may also be separate from the document management system 102, further divided among other entities, and so forth. Functionality may be implemented locally by the document management system 102 and/or remotely, e.g., through access by a communication module 116 such as a mobile application or browser of the client device 104 via the network 106. Generally speaking, the client device 104 leverages functionality represented by the communication module 116 to access the document management system 102 via the network 106, e.g., to perform actions in relation to the digital document 112.

The digital document 112 includes one or more text compositions organized in a prearranged manner. As one example, a user may provide a text composition to a content editor via the client device 104 as a complete composition. As another example, the user may compose the text composition using a word processing application via the client device 104. Further, the user may use a word processing application to modify an existing text composition. Regardless of how the text composition is provided to the document management system 102, the digital document 112 includes a master text composition which identifies the digital document 112 with respect to other digital documents from the digital corpus 108. In some cases, the user may indicate that a preexisting text composition, e.g., previously constructed and persistently stored by the document management system 102), is a master text composition for the digital document 112.

The variant text compositions are typically generated from the master text composition of the digital document 112 to which the variant text compositions are assigned. By way of example, the master text composition is displayed via the client device 104 where the user can edit the text thereof and save the edited text as a variant text composition of the digital document 112. As another example, the document management system 102 may automatically modify a master text composition to create one or more variant text compositions of the digital document 112, e.g., by utilizing a text modification algorithm. Examples of modifications that may be made automatically and/or by a user include summarization, truncation, reordering of sentences, and linguistic adaptation. Examples of linguistic adaptation include customizing words to a particular audience, such as based on demographic information for an audience, customizing words to a language or dialect, and so forth. In some instances, different variant text compositions of the digital document 112 are assigned to different computing contexts. The document management system 102 may be configured to identify a computing context associated with a request for the digital document 112 (e.g., mobile context, tablet context, or desktop context), match the computing context to one of the variant text compositions (or the master text composition) associated with the digital document 112, and provide the selected text composition for the requesting device. The digital corpus 108 may be organized into fragments 118.

Conventional systems for reviewing modifications to digital documents and persisting changes to variant documents are fractured, modal, and require separate access to different workflows to edit a document, review modifications to the document, and update a collection of related documents. As such, these conventional approaches lead to user frustration and computational inefficiencies of the computing devices leveraged by such systems. In contrast to these conventional systems, the document management system 102 employs a consistency engine 120 to generate updated text compositions and documents as part of deploying the fact replacement and style consistency tool, which supports consistent changes to text content from the digital corpus 108.

To implement this fact replacement and style consistency tool, the consistency engine 120 includes a content editor module 122, an intelligent review module 124, and a variant update module 126. Although functionalities of the content editor module 122, the intelligent review module 124, and the variant update module 126 are illustrated as separate from the client device 104, these functionalities may also be incorporated as part of the client device 104, further divided among other entities, and so forth.

The content editor module 122 includes functionality to create and edit the digital document 112. The content editor module 122, for instance, may receive user inputs to create a text composition. At a later point in time, user inputs may also be received to edit the text composition via the content editor module 122. The content editor module 122 also determines whether other portions of a text composition may be factually or stylistically inconsistent as a result of an editing input. This may be performed in order to maintain factual accuracy, logical consistency, linguistic correctness, and stylistic continuity.

The intelligent review module 124 includes functionality to review changes to text compositions of the digital document 112. The intelligent review module 124, for instance, may receive multiple different edited versions of a text composition from different collaborators. The intelligent review module 124 classifies changes in a text composition and outputs the changes to enable quicker review by a user. This functionality may include generation and presentation of a user interface for reviewing changes and selecting revisions to commit to a text composition of the digital document 112.

The variant update module 126 is configured to identify variants and fragments impacted by a committed change to the digital document 112. The variant update module 126 also generates potential changes for updating variants. This may be performed in order to maintain factual accuracy, logical consistency, linguistic correctness, and stylistic continuity for the digital document 112 and the digital corpus 108.

Having considered an example environment, consider now a discussion of some example details of the techniques for a fact replacement and style consistency tool in a digital medium environment in accordance with one or more implementations.

Fact Replacement and Style Consistency Tool

Figure 2:
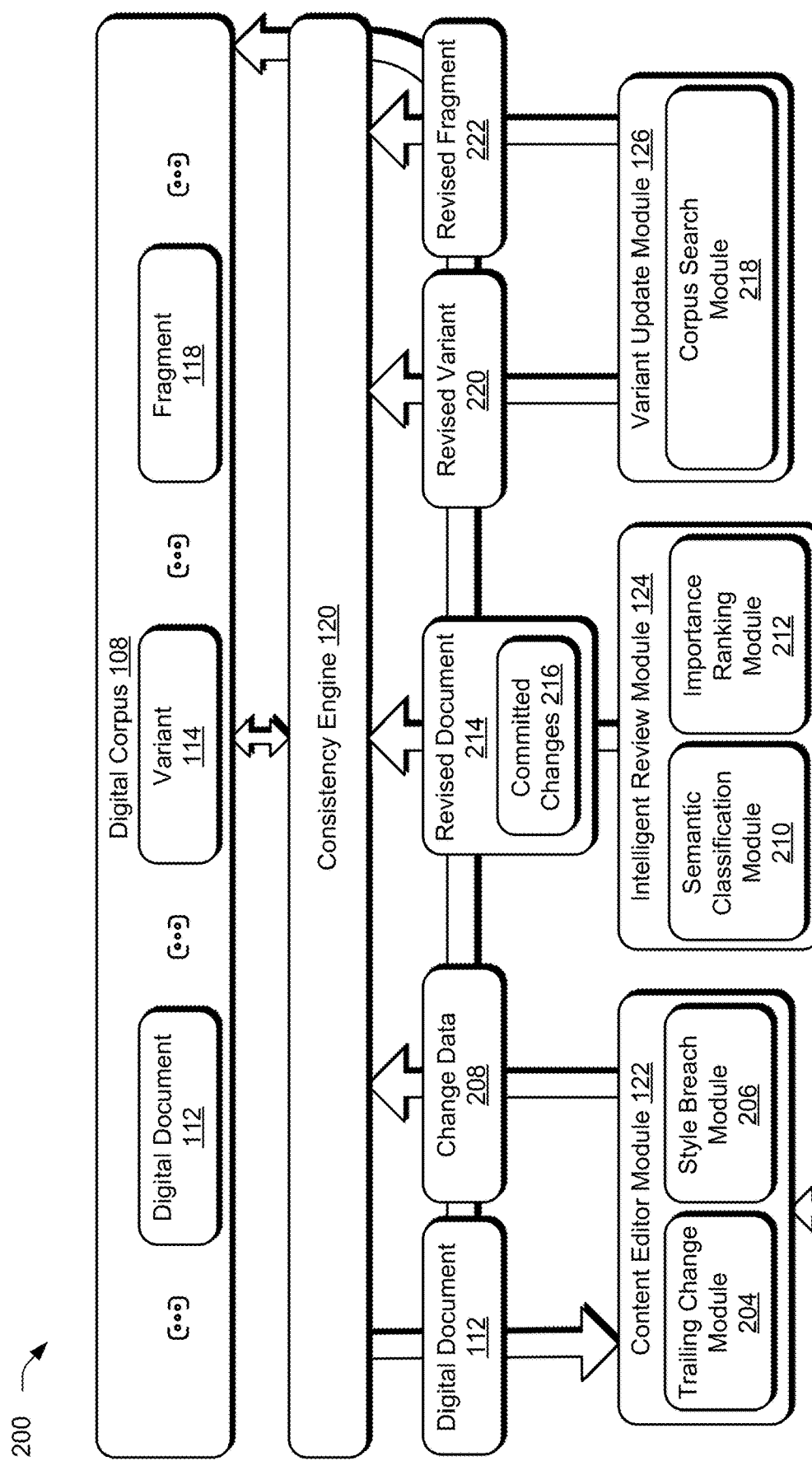
FIG. 2 depicts a system in an example implementation showing operation of a consistency engine to implement fact replacement and style consistency across multiple documents.
Figure 3:
FIG. 3 depicts an example implementation in which content of a digital document is edited as part of implementing fact replacement and style consistency across multiple documents.

FIG. 2 depicts a system 200 in an example implementation showing operation of the consistency engine 120 to implement a fact replacement and style consistency tool. FIG. 3 depicts an example implementation 300 in which content of a digital document is edited as part of the implementing the fact replacement and style consistency tool in relation to the system of FIG. 2. The following discussion describes techniques that may be implemented utilizing the previously described systems and devices. In portions of the following discussion, reference is made interchangeably to FIGS. 2 and 3.

The illustrated example 300 includes the client device 104 of FIG. 1. The example 300 further depicts the client device 104 displaying the digital document 112 via an editor user interface 302. The editor user interface 302 represents a user interface presented by the content editor module 122. In this example, the content editor module 122 receives the digital document 112 from the document management system 102. The content editor module 122 then detects an input 202 specifying a triggering change 304 (depicted in FIG. 3 as underlined text) to an initial portion of the digital document 112. In accordance with one or more implementations, a manual change may be detected based on a user input to the initial document portion. As shown, for instance, a user input is received to change a sentence in the digital document 112 from "Neptune is the eighth planet from the Sun" to "Neptune is the ninth planet from the Sun." The triggering change 304 is then applied to the initial document portion of the digital document 112. As another example, the initial document portion which contains the triggering change 304 is received via a copy and paste action by the user from another document.

A trailing change module 204 of the content editor module 122 is then employed to detect a potential trailing change 306 to a document portion based on the triggering change 304. The trailing change module 204, for instance, may be configured to perform natural language processing using machine learning. One example of natural language processing is natural language understanding (NLU), which is tasked with understanding "what" is included within the natural language. To understand what is included, the trailing change module 204 includes functionality to address diverse syntax through use of a lexicon, a parser, and grammar rules to break a series of text (e.g., the initial portion of the digital document 112) into an internal representation. The internal representation, for instance, may be configured as a numerical representation through use of a bag-of-words technique, embeddings, machine learning, and so forth. This internal representation may then be compared by the trailing change module 204 with similarly generated internal representations of other document portions, hereinafter referred to as candidate document portions, to determine if the candidate document portions are to be changed. Through comparison of these representations, the trailing change module 204 may determine whether the triggering change 304 made to the initial portion of the digital document 112 is relevant to the candidate document portions.

In a first example, a bag-of-words technique is employed by the trailing change module 204 to generate the internal representation as a bag-of-words model, also known as a vector space model. In this model, a multiset (i.e., bag) of words is used that may disregard grammar and word order but may address multiplicity. In a second example, the trailing change module 204 implements an embedding-based technique (e.g., word2vec) which refers to a set of language model and feature learning techniques in NLP in which words from a vocabulary are mapped to vectors of real numbers to generate the internal representation. In a third example, the trailing change module 204 implements machine learning techniques to generate the internal representation from features that are learned from words of the initial portion of the digital document 112 and/or candidate document portions. In these examples, words may include individual words as well as named entities.

The internal representations, once generated, are then passed as an input to a portion representation model to generate a portion representation of the initial portion of the digital document 112 (e.g., a portion of the digital document 112 corresponding to the triggering change 304) or individual candidate document portions. The portion representation model, for instance, may generate the portion representation using an aggregation operation. In one example, concatenation or averaging across the internal representations is used to generate the portion representation. In another example, the trailing change module 204 employs machine learning techniques such that the portion representation model takes the sequence of the words in the internal representation into account. This may be performed using a variety of machine learning techniques, including use of a recurrent neural network, a long short-term memory ("LSTM") network, and so forth. The portion representations, once generated, thus supply the trailing changes 306 for respective ones of the candidate document portions.

In this example, the trailing change 306 (depicted in FIG. 3 as highlighted text) is identified in the digital document 112 via the editor user interface 302. As shown, for instance, the trailing change module 204 identifies the sentence "In about 230 years, Pluto will be the eighth planet from the Sun for a while," as potentially requiring a change to maintain factual consistency, based on the triggering change 304. In this way, the trailing change module 204 is configured to ensure that other portions of the digital document 112 are consistent with the triggering change 304.

A style breach module 206 of the content editor module 122 is employed to identify a style breach 308 for a document portion based on the triggering change 304. In one or more implementations, the style breach module 206 identifies a portion of text that is inconsistent with other portions of a document by employing a model trained using machine learning to detect style breaches. In one or more implementations, the style breach model 206 employs or is a natural language processing model, neural network, or algorithm trained using machine learning for sequence classification. In one such example, LSTM networks are used. The structure of LSTMs is configured to handle both short range (immediately preceding words) as well as longer ranges. The model intrinsically encodes a word-by-word sequential dependence. Natural language sentences may be analyzed using a tree based structure, e.g., dependency parse trees as also known as "Tree LSTMs." In other words, the style breach module 206 may be configures as a machine learning algorithm that takes as input portions of a text composition and outputs data identifying a portion of the text composition which is stylistically inconsistent with other portions.

In this example, the style breach 308 (depicted in FIG. 3 below the horizontal line) is identified in the digital document 112 via the editor user interface 302. In at least one implementation, the notification of the style breach 308 is presented initially, and the portion of the digital document 112 identified as a potential style breach is visually separated from the rest of the document in response to a hover input over the notification. As illustrated, for instance, the trailing change module 204 identifies the last three sentences as potentially requiring a change to maintain stylistic consistency. In this way, the style breach module 206 is configured to ensure that the style of the digital document 112 is consistent.

To finish a session for editing content of the digital document 112, a user of the client device 104 may provide user input via an instrumentality 310 of the editor user interface 302. In some implementations, data describing changes to the digital document 112 is sent to the document management system 102 in response to receiving user input via the instrumentality 310. In other implementations, the edited digital document (e.g., a variant 114) is stored by the document management system 102 in response to receiving user input via the instrumentality 310. For example, the edited digital document is stored at the storage device 110. Accordingly, the techniques described herein enable stylistic and factual consistency in a digital document during content editing.

Figure 5:
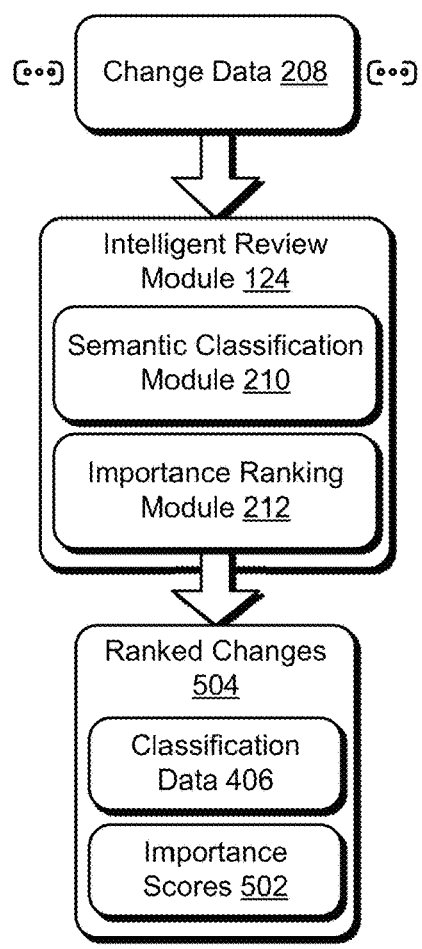
FIG. 5 depicts an example system showing operation of an intelligent review module in greater detail.

FIG. 4 depicts an example implementation 400 of intelligent review of a digital document as part of implementing a fact replacement and style consistency tool. FIG. 5 depicts an example system 500 showing operation of the intelligent review module 124 of FIG. 2 in greater detail. The following discussion describes techniques that may be implemented utilizing the previously described systems and devices. The illustrated example 400 includes interface portions for two text compositions (402a and 402b) of the digital document 112. These interface portions are included as part of a reviewer user interface 404. The reviewer user interface 404 represents a user interface presented by the intelligent review module 124. The intelligent review module 124 receives change data 208 describing changes to a text composition of the digital document 112, as compared to a master text composition of the digital document 112. In this example, the intelligent review module 124 receives the change data 208 (for the text composition 402b) describing changes differing from the text composition 402a. In some instances, the text compositions 402a and 402b may represent an original and edited version of the digital document 112. While in other instances, the text compositions 402a and 402b represent two different edited versions of the digital document 112. For instance, the text compositions 402a and 402b represent different versions submitted for review by collaborators.

A semantic classification module 210 of the intelligent review module 124 is employed to classify the changes indicated from the change data 208. In one or more implementations, the changes are classified as insertion, deletion, modification, lexical paraphrase, or transformational paraphrase based on the semantic nature of the changes indicated by the change data 208. An insertion represents text inserted and a deletion represents text deleted. A modification represents a factual change at the word level. A lexical paraphrase represents a non-factual change at the word level. A transformational paraphrase represents a non-factual change at a higher level than lexical paraphrase, e.g., a threshold number of words, a threshold number of characters, and so forth.

In implementations, the semantic classification module 210 is a natural language processing model trained using machine learning. For example, the natural language processing model is pre-trained to classify changes by category and output classification data 406 indicative of the category, e.g., a tag. In the example, the natural language processing model is trained using a corpus of documents pairs each including an original document and a modified variant.

Continuing the example, sentence pairs (from the original and modified variant) are labelled to indicate a category of change. The classifications, for instance, may be generated as a numerical representation (e.g., vector) based on natural language processing using machine learning.

An importance ranking module 212 of the intelligent review module 124 is employed to generate importance scores 502 for ranking the changes 504. The importance scores 502, for instance, may be generated as a numerical representation based on a regression model, natural language processing, and so forth. For example, the importance ranking module 212 is a regression model trained to extract features from the classified change data. In the example, the extracted features are weighted based on the classification data 406. Extracted features represent characteristic data describing lexical and/or structural features of the change data 208. Lexical features refer to differences between discrete representations of text indicated by the change data 208, e.g., words, sentences, and paragraphs. By way of example, lexical features can describe at least one of a category of change (e.g., classification), word frequency, change frequency, or readability scores. Structural features refer to differences in a higher level of discrete representations of text indicated by the change data 208, as compared to the lexical features. In a scenario where the lexical features refer to differences at a word level, for instance, the structural differences refer to differences at a sentence level. By way of example, structural features can describe at least one of keyword rank, page rank correspondence to keywords, sentence position in a paragraph, sentence position in a text composition, or paragraph position in a text composition.

The importance scores 502 are employed by the intelligent review module 124 to rank the changes indicated by the change data 208. In this example, the changes and the corresponding classification data 406 are displayed in ranked order via the reviewer user interface 404. In one or more implementations, the changes and the corresponding classification data 406 are displayed in an order that the changes occur in the digital document 112. Selectable options 408 are presented along with the changes to enable a user to quickly review and confirm desired changes for entry. In some implementations, a revised version 410 of the digital document 112 is presented to reflect selection and de-selection of the selectable options 408. In the example, all of the selectable options 408 are selected and thus the revised version 410 reflects incorporation of all of the changes. In an event that a user de-selects one of the selectable options 408, though, the change corresponding to the de-selected option is not incorporated in the revised version 410, e.g., the revised is re-configured to present "Version 1" for the de-selected change.

To indicate that review of the text compositions 402a and 402b of the digital document 112 is finished, a user may provide user input via an instrumentality 412 of the reviewer user interface 404. A revised document 214 is generated by the intelligent review module 124 in response to user input via this instrumentality 412. The revised document 214 may be stored as part of the digital corpus 108. In one example, the revised document 214 is the master document for the digital document 112. In another example, the revised document 214 is a variant 114 of the digital document 112. The revised document 214 reflects committed changes 216, which are committed in response to user input via the instrumentality 412.

Figure 6:
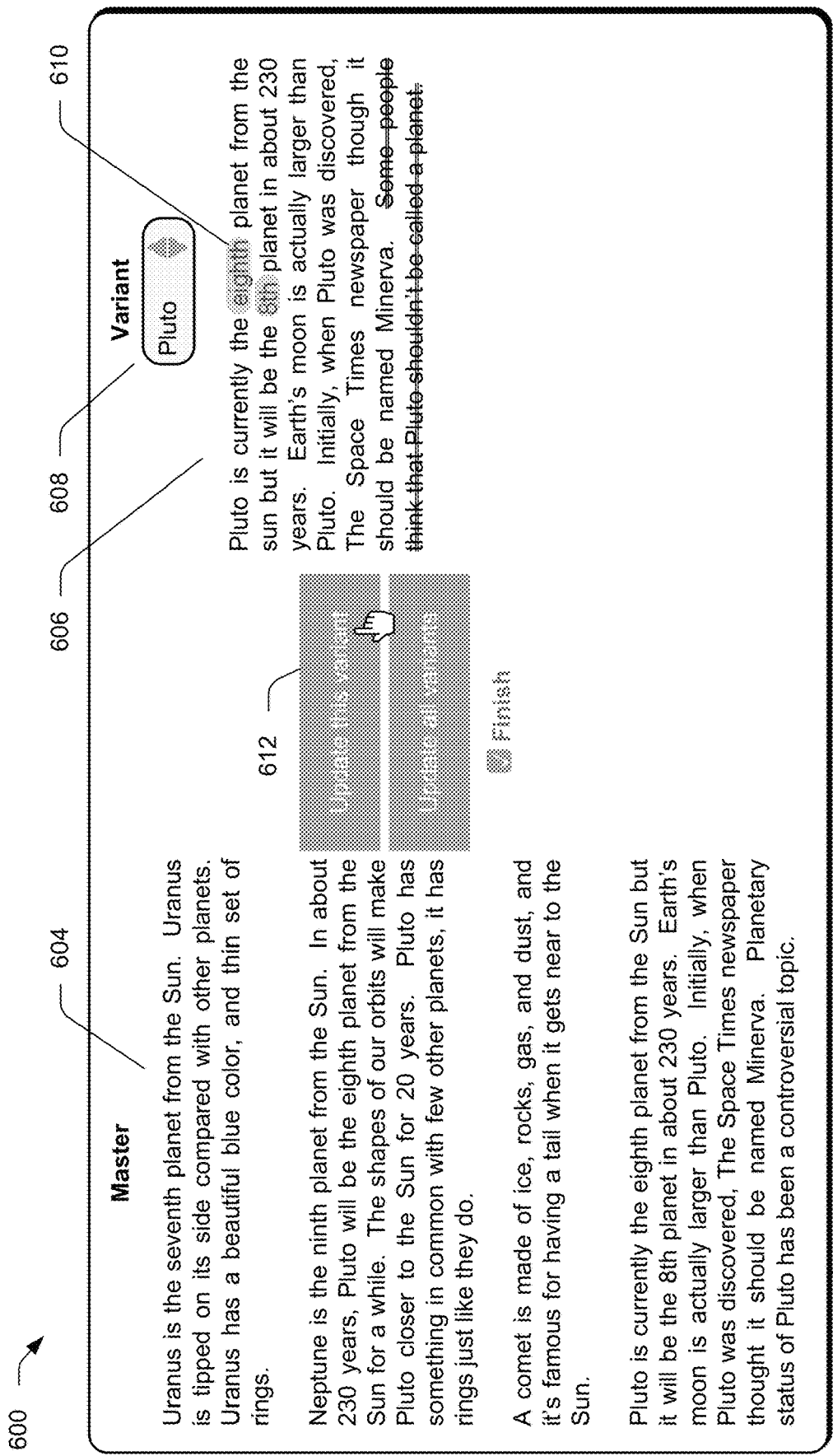
FIG. 6 depicts an example implementation in which a document variant update is performed as part of implementing fact replacement and style consistency across multiple documents.

FIG. 6 depicts an example implementation 600 in which a document variant update is performed as part of implementing fact replacement and style consistency across multiple documents. The illustrated example 600 includes an update user interface 602 displaying a master text composition 604 of the digital document 112 and a variant text composition 606 of the digital document 112. The update user interface 602 represents a user interface presented by the variant update module 126. In response to receiving the revised document 214 (e.g., the digital document 112 including the committed changes 216 as described above), a corpus search module 218 of the variant update module 126 determines whether one or more instances of the variant text composition 606 of the digital document 112 may require changes as a result of the committed changes 216. For example, the corpus search module 218 identifies instances of the variant text composition 606 that are assigned to the digital document 112 as part of the digital corpus 108. The update user interface 602 is depicted in FIG. 6 including a variant selector 608 which is selectable via user input to select among variant text compositions for display. It should be understood that while one variant text composition 606 is depicted in FIG. 6, numerous instances of the variant text composition 606 may exist for the digital document 112.

The corpus search module 218 represents functionality to determine whether to propose changes to the variant text composition 606 based on the committed changes 216. A correspondence model is generated from portions of the variant text composition 606. The correspondence model indicates portions of the variant text composition 606 that correspond to portions of the master text composition 604 which include the committed changes 216. The correspondence model is generated to indicate these correspondences based on an analysis of how similar those portions are, one to another. In some implementations, the corpus search module 218 determines whether to propose changes to the variant text composition 606 based on similarity scores generated by the correspondence model. The corpus search module 218 uses similarity data generated by the correspondence model to map the most similar portions from the master text composition 604 to the variant text composition 606. A similarity score may be generated to account for semantic similarities in the portions of the variant text composition 606 and the master text composition. For example, different words can have different levels of impact on the similarity score. Words that tend to occur more frequently in text may have a lower impact on the score than less frequent words. In one approach, an edit distance function is used to quantify similarity of portions based on a cost required to transform the portion of the variant text composition 606 so that it is consistent with the master text composition 604.

The variant update module 126 determines proposed changes 610 to a portion of the variant text composition 606 based on the committed changes 216. In some cases, the variant update module 126 determines the proposed changes 610 based on the classification data 406 for the corresponding committed change 216. For example, where the classification data 406 indicates that the committed change 216 is a deletion, the variant update module 126 may search for the deleted portion (or at least one word from the deleted portion) in the variant text composition 606 and propose deleting that word from the variant text composition 606. Where multiple instances of the word are present in the variant text composition 606, the variant update module 126 may further compare the context of the instances of the word in the variant text composition 606 to the context of the deleted portion in the master text composition 604. The context can include, for example, one or more words preceding, following, and or surrounding the portion. In an example where the classification data 406 indicates that the committed change 216 is an insertion, the variant update module 126 may identify a position for insertion in the variant text composition 606 and propose insertion at that position. In some cases, this includes the variant update module 126 comparing the portions of the variant text composition 606 to the context of the insertion in the modified master text composition 604. In an example where classification data 406 indicates that the committed change 216 is a modification, a lexical paraphrase, or a transformation paraphrase, the variant update module 126 may search the variant text composition 606 for the portion of the master text composition 604 that was replaced (e.g., as a result of the committed changes 216) and propose replacing the portion of the variant text composition 606 with the corresponding committed change 216. Similar to a deletion, where multiple instances of the replaced portion are present in the variant text composition 606, the variant update module 126 may further compare the context of the portions in the variant text composition 606 to the context of the committed changes 216.

In one or more implementations, the variant update module 126 determines the proposed changes 610 by implementing techniques similar to those employed by the trailing change module 204, as described above. For instance, the variant update module 126 generates an internal representation for the portion of the master text composition 604 which contains the committed change 216 and for candidate portions of the variant text composition 606. By way of example, the variant update module 126 employs machine learning techniques to generate portion representations for the master text composition 604 which contains the committed change 216 and for candidate portions of the variant text composition 606. This may be performed using a variety of machine learning techniques, including use of a recurrent neural network, an LSTM network, and so forth. The portion representations, once generated, thus supply the proposed changes 610 for the variant text composition 606.

The proposed changes 610 may be employed by the variant update module 126 in a variety of ways. In this example, the candidate portions of the variant text composition 606, e.g., the portions with a similarity score above a threshold amount, are output to the user interface by the variant update module 126. The proposed changes 610 are displayed as annotated changes to the variant text composition 606 via the update user interface 602. The update user interface 602 includes instrumentalities which enable a user to quickly review and confirm updates for entry into the selected variant text composition 606 and/or for entry into all variant text compositions assigned to the master text composition 604.

To indicate that updating of the variant text composition 606 of the digital document 112 is finished, a user may provide user input via an instrumentality 612 of the update user interface 602, e.g., "Update this variant" or "Update all variants". A revised variant 220 is generated by the variant update module 126 in response to user input via the instrumentality 612. The revised variant 220 represents the variant text composition with the proposed changes 610 committed. The revised variant 220 may be stored as part of the digital corpus 108, for example, at the storage device 110 of the document management system 102.

FIG. 7 depicts an example implementation 700 in which an update of a document corpus is performed as part of implementing fact replacement and style consistency across multiple documents. The illustrated example 700 includes a corpus user interface 702 displaying a summary 704 of the changes previously committed, e.g., to the revised document 214 or the revised variant 220. The corpus user interface 702 represents a user interface presented by the variant update module 126. In this example, the summary 704 output by the variant update module 126 may correspond to the classification data 406. The example 700 represents an alternative or addition to the implementation depicted in the example 600. In some instances, for instance, the variant update module 126 presents the corpus user interface 702 in response to receiving the committed changes 216. While in other instances, however, the variant update module 126 presents the corpus user interface 702 in response to generating the revised variant 220, e.g., in response to receiving user input to finish variant update.

The corpus search module 218 then searches the digital corpus 108 for the fragments 118 associated with content which may be impacted by the committed changes 216 and/or the revised variant 220. The corpus search module 218 returns the content fragments 118 which include content (e.g., a text composition) impacted by the committed changes 216 and/or the revised variant 220. In some implementations, the techniques described above in relation to the example implementation 600 are also employed by the corpus search module 218 to identify the content fragments 118.

The variant update module 126 outputs the content fragments 118 to the corpus user interface 702. The corpus user interface 702 includes instrumentalities which enable a user to quickly confirm updates for entry to the content fragments 118 that are impacted by the committed changes 216 and/or the revised variant 220. To indicate that updating of the digital corpus 108 is finished, a user may provide user input via an update instrumentality 706 of the corpus user interface 702. A revised fragment 222 is generated by the variant update module 126 in response to the user input via the update instrumentality 706. The revised fragment 222 represents updated content stored in association with the content fragment 118 as part of the digital corpus 108 to maintain consistency with the committed changes 216 and/or the revised variant 220.

Figure 8:
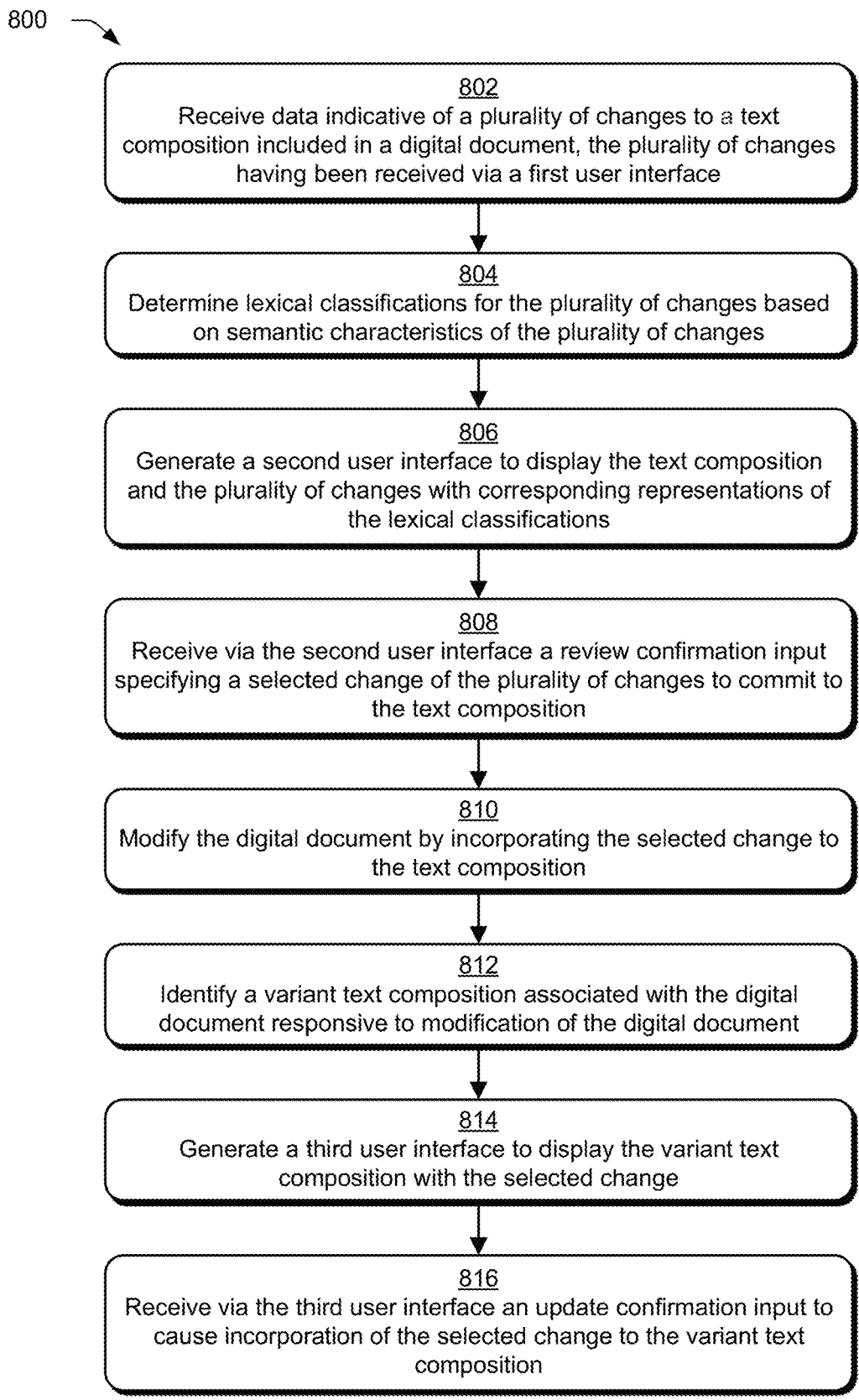
FIG. 8 depicts a procedure in an example implementation in which a change to a text composition is incorporated into a variant text composition.

FIG. 8 depicts a procedure 800 in an example implementation in which a change to a text composition is incorporated into a variant text composition.

Data indicative of a plurality of changes to a text composition included in a digital document is received, the plurality of changes having been received via a first user interface (block 802). By way of example, changes are received via the editor user interface 302 and applied to the digital document 112 by the content editor module 122. The intelligent review module 124 receives the edited version of the digital document 112 and/or data describing the changes. Lexical classifications for the plurality of changes are determined based on semantic characteristics of the plurality of changes (block 804). By way of example, the semantic classification module 210 employs an NLP model to generate output data describing a semantic nature of the change data 208. Lexical classifications of the changes are determined by comparing semantic characteristics of the changes, as indicated by the output data, to threshold data for factual changes and/or transformational changes. For instance, the lexical classifications represent the classification data 406, which indicates a category of change based at least in part on whether a change is factual and whether a change is transformational. A second user interface is generated to display the text composition and the plurality of changes with corresponding representations of the lexical classifications (block 806). For example, the intelligent review module 124 outputs the changes for presentation via the reviewer user interface 404 with labels representing the classification data 406, e.g., to indicate whether the changes are factual, transformational, and so forth. A review confirmation input is received via the second user interface specifying a selected change of the plurality of changes to commit to the text composition (block 808). For instance, a user selects a change to commit via the selectable controls 408 and provides input via the instrumentality 412 of the reviewer user interface 404 to confirm the change. In a scenario in which the revised version 410 is presented, the revised version 410 is configured to reflect the selection of the change via the reviewer user interface 404 in real-time. By way of example, the text composition is a variant text composition of the digital document 112. The digital document is modified by incorporating the selected change to the text composition (block 810). By way of example, the intelligent review module 124 of the consistency engine 120 incorporates the committed change 216 into a master text composition of the digital document 112. The intelligent review module 124 generates the revised document 214 by incorporating the committed change 216 into the digital document 112.

A variant text composition associated with the digital document is identified in response to modification of the digital document (block 812). For instance, the variant update module 126 of the consistency engine 120 identifies the variant text composition 610 in response to the intelligent review module 124 generating the revised document 214. The variant update module 126 utilizes the corpus search module 218 to search the digital corpus 108 for variants 118 assigned to the digital document 112 which include content similar to the committed change 216. A third user interface is generated to display the variant text composition with the selected change (block 814). For example, the variant update module 126 displays the master text composition 604 and the variant text composition 606 with the proposed changes 610 via the update user interface 602. An update confirmation input is received via the third user interface to cause incorporation of the selected change to the variant text composition (block 816). By way of example, input is received via the instrumentality 612 of the update user interface 602. In response to receiving this input, the variant update module 126 incorporates the committed change 216 into the variant 118 to generate the revised variant 220. The revised variant 220 is updated in the digital corpus 108.

Figure 9:
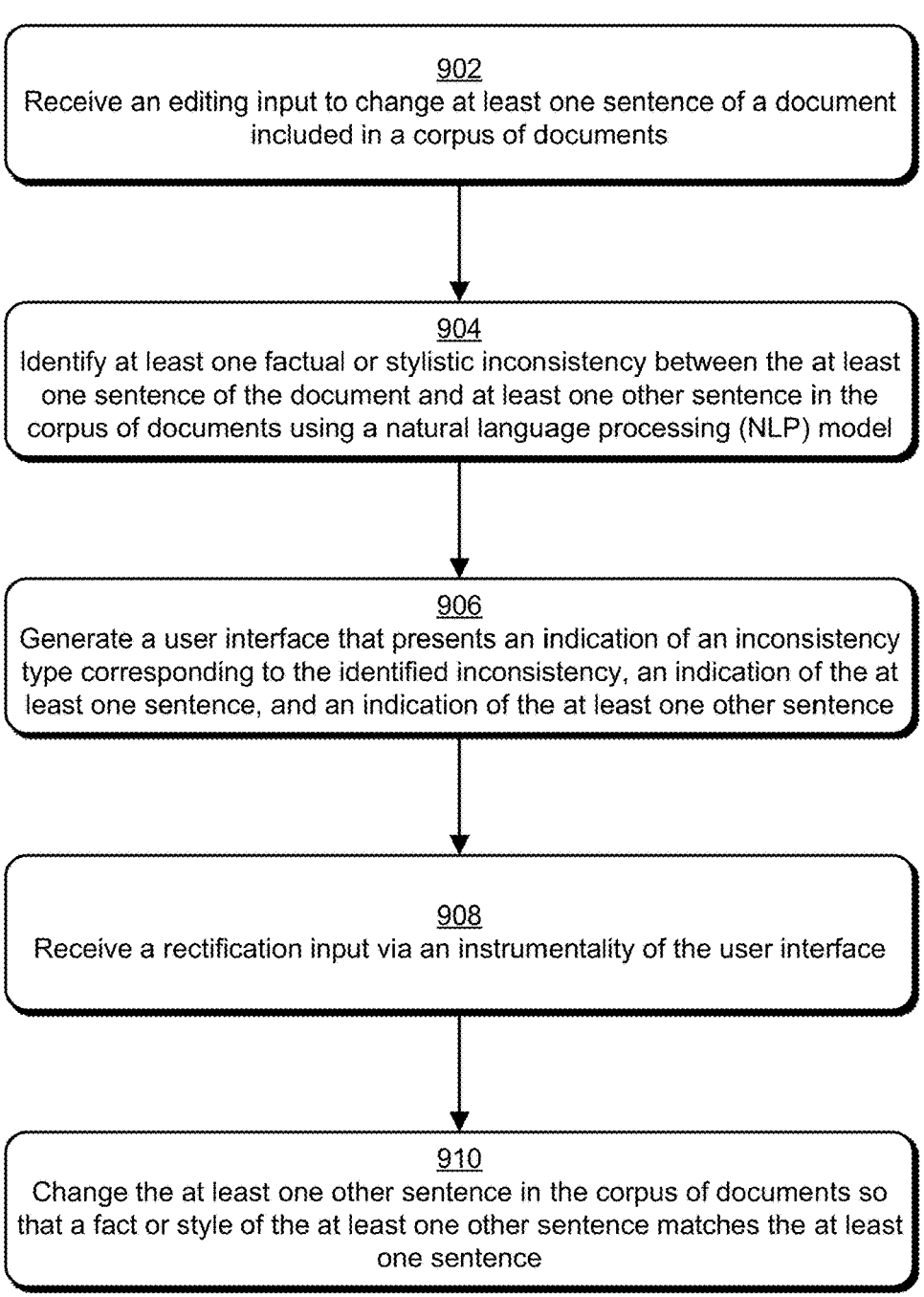
FIG. 9 depicts a procedure in an example implementation in which factual and stylistic inconsistencies in a corpus of documents are rectified.

FIG. 9 depicts a procedure 900 in an example implementation in which factual and stylistic inconsistencies in a corpus of documents are rectified.

An editing input is received to change at least one sentence of a document included in a corpus of documents (block 902). By way of example, the content editor module 122 receives the input 202 to change the digital document 112.

At least one factual or stylistic inconsistency is identified between the at least one sentence of the document and at least one other sentence in the corpus of documents (block 904). In accordance with the principles discussed herein, the at least one factual or stylistic inconsistency is identified using a natural language processing (NLP) model trained to describe semantic characteristics of sentences. By way of example, the intelligent review module 124 identifies a factual or stylistic inconsistency between the at least one sentence changed at block 902 in the digital document 112 and at least one other sentence in the digital corpus 108, such as a sentence in the variant 114. To identify this inconsistency, the intelligent review module 124 uses an NLP model trained to describe semantic characteristics of sentences. In accordance with the described techniques, the intelligent review module 124 identifies factual and stylistic inconsistencies not only between sentences in a same document of the corpus but also between different documents in the corpus. The corpus may include different documents, for instance, that are optimized for different types of devices, such as a mobile phone version of a document, a desktop version of the document, a tablet version of the document, and so forth.

A user interface is generated that presents an indication of an inconsistency type corresponding to the identified inconsistency, an indication of the at least one sentence, and an indication of the at least one other sentence (block 906). In accordance with the principles discussed herein, the inconsistency type is based on the semantic characteristics described by the NLP model. By way of example, the intelligent review module 124 generates the reviewer user interface 404, which includes the output classification data 406 indicative of a type of inconsistency, and indications of sentences from the text compositions 402a and 402b that include the inconsistencies. In one or more implementations, the indications of the sentences that include the inconsistencies are presented as highlights applied to the sentences within paragraphs of text. For instance, these highlights may comprise any one or combination of underlining applied to the sentences, an overlayed color applied to the sentences, strikethrough applied to the sentences, and so forth.

A rectification input is received via an instrumentality of the user interface (block 908). By way of example, the variant update module 126 receives a rectification input based on input received via the reviewer user interface 404. The at least one other sentence in the corpus of documents which includes the inconsistency is changed so that a fact or style of the at least one other sentence matches the at least one sentence changed by the editing input (block 910). In accordance with the principles discussed herein, the at least one other sentence is changed responsive to receiving the rectification input. By way of example, the variant update module 126 changes the at least one other sentence having the inconsistency identified at block 904 responsive to the input received at block 908. The variant update module 126 changes the at least one other sentence so that a fact or style of the at least one other sentence—causing the inconsistency—matches the at least one sentence. This is effective to eliminate factual and stylistic inconsistencies across a corpus of documents.

Having described example procedures in accordance with one or more implementations, consider now an example system and device that can be utilized to implement the various techniques described herein.

Example System and Device

Figure 10:
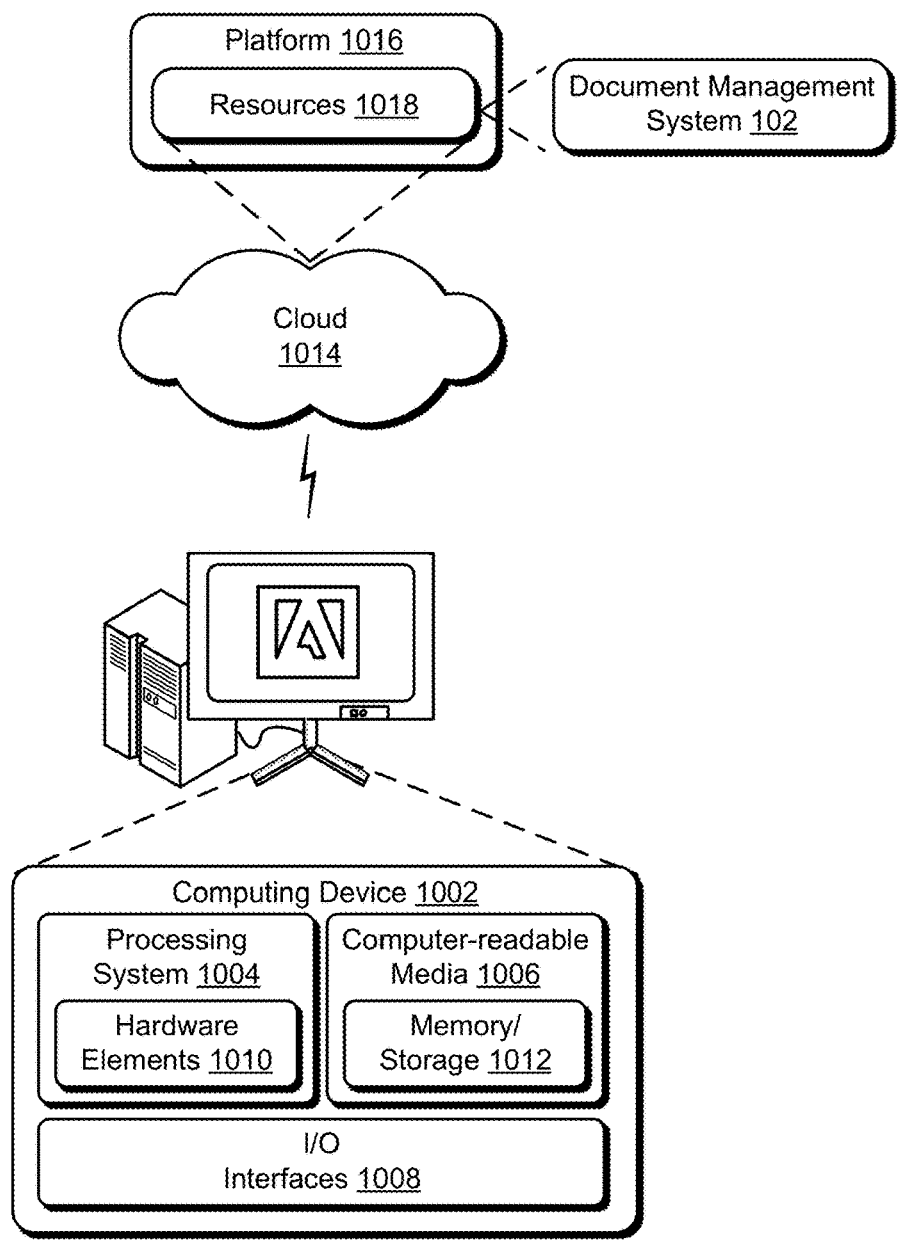
FIG. 10 illustrates an example system including various components of an example device that can be implemented as any type of computing device as described and/or utilized with reference to FIGS. 1-9 to implement embodiments of the techniques described herein.

FIG. 10 illustrates an example system generally at 1000 that includes an example computing device 1002 that is representative of one or more computing systems and/or devices that may implement the various techniques described herein. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1006 is illustrated as including memory/storage 1012. The memory/storage 1012 represents memory/storage capacity associated with one or more computer-readable media. The memory/storage 1012 may include volatile media (such as random access memory (RAM)) and/or nonvolatile media (such as read only memory (ROM), Flash memory, optical disks, magnetic disks, and so forth). The memory/storage 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. This is illustrated through inclusion of the document management system 102. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to maintain factual and stylistic consistency across a corpus of documents, a method implemented by at least one computing device, the method comprising:
    receiving an editing input to change a fact or a style of at least one sentence of a document included in a corpus of documents so that the at least one sentence includes a changed fact or changed style, respectively;
    responsive to the editing input, identifying at least one factual or stylistic inconsistency between the at least one sentence of the document having the changed fact or the changed style and at least one different sentence in the corpus of documents having the fact or the style based on the editing input, the at least one factual or stylistic inconsistency identified by using a natural language processing (NLP) model trained to describe semantic characteristics of sentences, and the at least one different sentence corresponding to a different document in the corpus than the document having the at least one sentence;
    generating a user interface that presents an indication of an inconsistency type corresponding to the identified inconsistency, an indication of the at least one sentence, and an indication of the at least one different sentence; and
    responsive to receiving a rectification input via an instrumentality of the user interface, changing the at least one different sentence in the corpus of documents so that the fact or the style in the at least one different sentence matches the changed fact or the changed style of the at least one sentence.

2. The method as described in claim 1, further comprising identifying the at least one factual inconsistency between the at least one sentence of the document and the at least one different sentence in the corpus of documents.

3. The method as described in claim 2, further comprising changing the at least one different sentence in the corpus of documents so that the fact in the at least one different sentence matches the changed fact of the at least one sentence.

4. The method as described in claim 1, further comprising identifying the at least one stylistic inconsistency between the at least one sentence of the document and the at least one different sentence in the corpus of documents.

5. The method as described in claim 4, further comprising changing the at least one different sentence in the corpus of documents so that the style in the at least one different sentence matches the changed style of the at least one sentence.

6. The method as described in claim 1, wherein the document having the at least one sentence and the different document in the corpus are optimized for output via different types of devices.

7. The method as described in claim 1, wherein the identifying identifies a plurality of factual or stylistic inconsistencies between the at least one sentence of the document and multiple different sentences in the corpus of documents by using the NLP model.

8. The method as described in claim 7, wherein the generating includes configuring the user interface to concurrently present indications of the plurality of factual or stylistic inconsistencies.

9. The method as described in claim 1, wherein the indications of the at least one sentence and the at least one different sentence comprise highlights within paragraphs of text.

10. The method as described in claim 9, wherein the highlights comprise at least one of underlining, overlaying color, or applying strikethrough.

11. A system comprising:
    at least one processor; and
    a memory having stored thereon computer-readable instructions that are executable by the at least one processor to perform operations comprising:
    receiving an editing input to change a fact or a style of at least one sentence of a document included in a corpus of documents so that the at least one sentence includes a changed fact or changed style, respectively;
    responsive to the editing input, identifying at least one factual or stylistic inconsistency between the at least one sentence of the document having the changed fact or the changed style and at least one different sentence in the corpus of documents having the fact or the style based on the editing input, the at least one factual or stylistic inconsistency identified by using a natural language processing (NLP) model trained to describe semantic characteristics of sentences, and the at least one different sentence corresponding to a different document in the corpus than the document having the at least one sentence;

generating a user interface that presents an indication of an inconsistency type corresponding to the identified inconsistency, an indication of the at least one sentence, and an indication of the at least one different sentence; and responsive to receiving a rectification input via an instrumentality of the user interface, changing the at least one different sentence in the corpus of documents so that the fact or the style in the at least one different sentence matches the changed fact or the changed style of the at least one sentence.

12. The system as described in claim 11, wherein the inconsistency type corresponding to the identified inconsistency is determined based on descriptions generated by the NLP model.

13. The system as described in claim 11, wherein the operations further include:

identifying a plurality of factual or stylistic inconsistencies between the at least one sentence of the document and multiple different sentences in the corpus of documents by using the NLP model;

determining a plurality of importance scores for the plurality of factual or stylistic inconsistencies based on the semantic characteristics; and generating a user interface that presents indications of the plurality of factual or stylistic inconsistencies, the indications being presented in a ranked order according to the plurality of importance scores.

14. Non-transitory computer-readable storage media having stored thereon instructions that are executable by a computing device to perform operations including:

receiving an editing input to change a fact or a style of at least one sentence of a document included in a corpus of documents so that the at least one sentence includes a changed fact or changed style, respectively;

responsive to the editing input, identifying at least one factual or stylistic inconsistency between the at least one sentence of the document having the changed fact or the changed style and at least one different sentence in the corpus of documents having the fact or the style based on the editing input, the at least one factual or stylistic inconsistency identified by using a natural language processing (NLP) model trained to describe semantic characteristics of sentences, and the at least one different sentence corresponding to a different document in the corpus than the document having the at least one sentence;

generating a user interface that presents an indication of an inconsistency type corresponding to the identified inconsistency, an indication of the at least one sentence, and an indication of the at least one different sentence; and responsive to receiving a rectification input via an instrumentality of the user interface, changing the at least one different sentence in the corpus of documents so that the fact or the style in the at least one different sentence matches the changed fact or the changed style of the at least one sentence.

15. The non-transitory computer-readable storage media as described in claim 14, wherein the operations further include identifying the at least one factual inconsistency between the at least one sentence of the document and the at least one different sentence in the corpus of documents.

16. The non-transitory computer-readable storage media as described in claim 15, wherein the operations further include changing the at least one different sentence in the corpus of documents so that the fact in the at least one different sentence matches the changed fact of the at least one sentence.

17. The non-transitory computer-readable storage media as described in claim 14, wherein the operations further include identifying the at least one stylistic inconsistency between the at least one sentence of the document and the at least one different sentence in the corpus of documents.

18. The non-transitory computer-readable storage media as described in claim 17, wherein the operations further include changing the at least one different sentence in the corpus of documents so that the style in the at least one different sentence matches the changed style of the at least one sentence.

19. The non-transitory computer-readable storage media as described in claim 14, wherein the identifying identifies a plurality of factual or stylistic inconsistencies between the at least one sentence of the document and multiple different sentences in the corpus of documents by using the NLP model.

20. The non-transitory computer-readable storage media as described in claim 19, wherein the generating includes configuring the user interface to concurrently present indications of the plurality of factual or stylistic inconsistencies.

* * * * *